(12) United States Patent
Nam et al.

(10) Patent No.: US 12,502,244 B2
(45) Date of Patent: Dec. 23, 2025

(54) METHOD FOR MANUFACTURING ADHESION-PREVENTING FILM

(71) Applicant: MEPION CO., LTD., Seoul (KR)

(72) Inventors: Jung Hyuk Nam, Seongnam-si (KR); Doo Yeol Choi, Dangjin-si (KR); Min Kyu Kang, Seoul (KR); Sun Hee Park, Seoul (KR)

(73) Assignee: MEPION CO., LTD., Seoul (KR)

( * ) Notice: Subject to any disclaimer, the term of this patent is extended or adjusted under 35 U.S.C. 154(b) by 181 days.

(21) Appl. No.: 18/484,746

(22) Filed: Oct. 11, 2023

(65) Prior Publication Data
US 2024/0033032 A1 Feb. 1, 2024

Related U.S. Application Data

(63) Continuation of application No. PCT/KR2021/006072, filed on May 14, 2021.

(30) Foreign Application Priority Data

Apr. 29, 2021 (KR) .................. 10-2021-0055588

(51) Int. Cl.
*A61B 90/00* (2016.01)
*A61L 31/04* (2006.01)
(Continued)

(52) U.S. Cl.
CPC ............ *A61B 90/08* (2016.02); *A61L 31/045* (2013.01); *A61L 31/10* (2013.01); *A61L 31/148* (2013.01); *A61B 2090/0816* (2016.02); *A61L 2400/18* (2013.01); *A61L 2420/02* (2013.01); *D01D 5/003* (2013.01); *D10B 2509/00* (2013.01)

(58) Field of Classification Search
CPC ............ A61B 90/08; A61B 2090/0816; A61L 31/14; A61L 31/044; A61L 31/10; A61L 31/045; A61L 31/145; A61L 31/146; A61L 31/148; A61L 2420/02; A61L 2400/12; A61L 2400/18; C08J 5/18; D06M 10/025;
(Continued)

(56) References Cited

FOREIGN PATENT DOCUMENTS

| CN | 102580166 A | 7/2012 |
| KR | 10-2007-0025724 A | 3/2007 |

(Continued)

OTHER PUBLICATIONS

Ji, Y. et al., "Dual-Syringe Reactive Electrospinning of Cross-Linked Hyaluronic Acid Hydrogel Nanofibers for Tissue Engineering Applications", Macromolecular Bioscience, 2006, vol. 6, pp. 811-817.

(Continued)

*Primary Examiner* — Monica A Huson
(74) *Attorney, Agent, or Firm* — Stein IP LLC

(57) ABSTRACT

Disclosed is a method for producing an anti-adhesion film. The method for producing an anti-adhesion film may include: a discharge step of separately electrospinning a biodegradable polymer solution filled in a first syringe and a crosslinking agent solution filled in a second syringe; and a film forming step of forming an anti-adhesion film by crosslinking of the biodegradable polymer by contact between the biodegradable polymer solution discharged in the form of fibers in the discharge step and the crosslinking agent solution discharged in the form of droplets in the discharge step.

16 Claims, 13 Drawing Sheets

(51) Int. Cl.
   *A61L 31/10*    (2006.01)
   *A61L 31/14*    (2006.01)
   *D01D 5/00*     (2006.01)

(58) Field of Classification Search
   CPC ....... D06M 23/16; D01D 5/38; D01D 5/0069;
                          D01D 5/003; D10B 2509/00
   See application file for complete search history.

(56)                References Cited

FOREIGN PATENT DOCUMENTS

| | | |
|---|---|---|
| KR | 10-1277509 B1 | 6/2013 |
| KR | 10-1409779 B1 | 6/2014 |
| KR | 10-1723193 B1 | 4/2017 |
| KR | 10-2018-0105496 A | 9/2018 |
| KR | 10-2019-0123132 A | 10/2019 |
| WO | WO 2015/138970 A1 | 9/2015 |

OTHER PUBLICATIONS

Blackstone Britani N. et al: "Collagen-Based Electrospun Materials for Tissue Engineering: A Systematic Review", Bioengineering, vol. 8, No. 3, Mar. 18, 2021 (Mar. 18, 2021), p. 39, XP093259068, ISSN: 2306-5354, DOI: 10.3390/bioengineering8030039, p. 7, first paragraph.

Extended European Search Report mailed Mar. 24, 2025, issued to corresponding European Application No. 21939434.3.

(a)

(b)

(c)

(a)

(b)

(c)

(d)

(a)

(b)

(c)

(d)

(a)

(b)

(c)

(d)

METHOD FOR MANUFACTURING ADHESION-PREVENTING FILM

CROSS-REFERENCE TO RELATED APPLICATION

This is a bypass continuation application of International Application No. PCT/KR2021/006072, filed May 14, 2021, which claims the benefit of Korean Patent Application No. 10-2021-0055588 filed Apr. 29, 2021, which is hereby incorporated by reference herein in its entirety.

TECHNICAL FIELD

The present invention relates to a method for producing an anti-adhesion film.

BACKGROUND ART

In general, adhesion refers to a phenomenon in which an organ or tissue surrounding a wound formed in the abdominal cavity during a surgical operation adheres to the wound area due to excessive production of fibrous tissue or clotting of leaked blood during healing of the wound after the surgical operation.

Conventionally, anti-adhesion films have been mainly used to prevent adhesion between a surgical site and normal tissue by forming a physical barrier in the region where adhesion is expected. In connection with this, Korean Patent No. 10-1277509 discloses a technology relating to a film for preventing tissue adhesion.

However, a conventional anti-adhesion film having a hydrophilic surface for attachment to a specific region has a problem in that, even when it is normally attached, it can be easily separated from the attached region due to the movement of organs in the abdominal cavity, and thus the anti-adhesion ability thereof may be lowered.

In addition, in the case of the anti-adhesion film having a hydrophilic surface, the shape of the film can be changed by body fluids and water generated around the attached region, or the original shape of the anti-adhesion film can be changed due to attachment between the hydrophilic surface portions of the anti-adhesion film, which serves as the main cause of reducing the performance of the anti-adhesion film.

Meanwhile, in a conventional art, when an anti-adhesion film is produced by electrospinning a biodegradable polymer, a crosslinking process is performed in which the anti-adhesion film is immersed in a crosslinking agent to control the biodegradation rate of the anti-adhesion film. However, the method of immersing an anti-adhesion film in a crosslinking agent has a problem in that a biodegradable polymer contained in the anti-adhesion film can be partially lost during the crosslinking process. In addition, the method of producing an anti-adhesion film by electrospinning a biodegradable polymer mixed with a crosslinking agent has a problem in that, since crosslinking is performed prior to electrospinning, the solution solidifies in the syringe due to crosslinking after a specific period of time, indicating that the spinning time is very limited and continuous spinning is difficult. Therefore, there is an urgent need to develop a new anti-adhesion film that overcomes the existing problems.

DISCLOSURE

Technical Problem

The present invention has been conceived to overcome the above-described problems, and an object of the present invention is to provide a technology for producing an anti-adhesion film using electrospinning, which enables continuous spinning for a long time, thus enabling mass production and making it possible to improve workability and productivity.

Another object of the present invention is to provide a technology for preventing a biodegradable polymer from being lost during a crosslinking process.

Still another object of the present invention is to provide a technology that enables mass production of an anti-adhesion film through process automation and is capable of producing a large-area anti-adhesion film.

Yet another object of the present invention is to provide an anti-adhesion film having excellent adhesive strength to an attachment region.

Still yet another object of the present invention is to provide an anti-adhesion film whose shape is not easily changed by water.

A further object of the present invention is to provide an anti-adhesion film that is convenient to use and has excellent workability.

Another further object of the present invention is to provide a technology that enables the adhesion force of an anti-adhesion film to be exerted only when necessary.

Still another further object of the present invention is to provide a technology that enables the surfaces of an anti-adhesion film to be intuitively distinguished.

Still yet another further object of the present invention is to provide a technology that is capable of controlling the biodegradation rate of an anti-adhesion film.

Objects to be achieved by the present invention are not limited to the above-described objects, and other objects not mentioned herein will be clearly understood by those skilled in the art to which the present invention pertains from the following description.

Technical Solution

To achieve the above objects, in one embodiment of the present invention, a method for producing an anti-adhesion film may include: a discharge step of separately electrospinning a biodegradable polymer solution filled in a first syringe and a crosslinking agent solution filled in a second syringe; and a film forming step of forming an anti-adhesion film by crosslinking of the biodegradable polymer by contact between the biodegradable polymer solution discharged in the form of fibers in the discharge step and the crosslinking agent solution discharged in the form of droplets in the discharge step.

In addition, in the discharge step, the biodegradable polymer solution filled in the first syringe may include at least one selected from the group consisting of collagen, hyaluronic acid, chitosan, and gelatin.

In addition, in the discharge step, the crosslinking agent solution filled in the second syringe may include a crosslinking agent, a first solvent, and a second solvent of a type different from the first solvent.

In addition, the crosslinking agent may be at least one selected from the group consisting of 1-ethyl-3-(3-dimethylaminopropyl)carbodiimide, dicyclohexyl carbodiimide, polyethylene glycol diacrylate, N-hydroxysuccinimide, and combinations thereof.

In addition, the concentration of the crosslinking agent in the crosslinking agent solution may be 1 to 2 w/w %.

In addition, the first solvent may be water, and the second solvent may be an aprotic polar solvent.

In addition, the method for producing an anti-adhesion film may further include a plasma step of modifying a surface of the anti-adhesion film by plasma-treating one surface or the other surface opposite to the one surface of the anti-adhesion film.

In addition, the method for producing an anti-adhesion film may further include a texturing step of forming a textured structure on one surface or the other surface opposite to the one surface of the anti-adhesion film.

In addition, the method for producing an anti-adhesion film may further include an adhesive layer forming step of forming an adhesive layer by applying a first coating material in a dot pattern to one surface or the other surface opposite to the one surface of the anti-adhesion film, wherein the first coating material may be at least one selected from the group consisting of collagen, hyaluronic acid, chitosan, and gelatin.

In addition, the method for producing an anti-adhesion film may further include a pore forming step of forming at least one pore in the anti-adhesion film.

In addition, the method for producing an anti-adhesion film may further include: a plasma step of modifying a surface of the anti-adhesion film by plasma-treating one surface or the other surface opposite to the one surface of the anti-adhesion film; and a first protrusion forming step of forming at least one first protrusion by applying a first coating material to the one surface or the other surface of the anti-adhesion film, wherein the first coating material may be at least one selected from the group consisting of collagen, hyaluronic acid, chitosan, and gelatin.

In addition, the method for producing an anti-adhesion film may further include: a plasma step of modifying a surface of the anti-adhesion film by plasma-treating one surface or the other surface opposite to the one surface of the anti-adhesion film; a texturing step of forming a textured structure on the one surface or the other surface of the anti-adhesion film; and a first protrusion forming step of forming at least one first protrusion by applying a first coating material to the surface having the textured structure formed thereon, wherein the first coating material may be at least one selected from the group consisting of collagen, hyaluronic acid, chitosan, and gelatin.

In addition, the method for producing an anti-adhesion film may further include: a plasma step of modifying a surface of the anti-adhesion film by plasma-treating one surface or the other surface opposite to the one surface of the anti-adhesion film; and a second protrusion and third protrusion forming step of forming at least one second protrusion by applying a second coating material to the one surface or the other surface of the anti-adhesion film and of forming at least one third protrusion by applying a third coating material of a type different from the second coating material to the surface having the second protrusion formed thereon, wherein, when the second protrusion and the third protrusion change to a liquid state, the second coating material and the third coating material may be mixed with each other to form an adhesive layer.

In addition, the method for producing an anti-adhesion film may further include: a plasma step of modifying a surface of the anti-adhesion film by plasma-treating one surface or the other surface opposite to the one surface of the anti-adhesion film; a texturing step of forming a textured structure on the one surface or the other surface of the anti-adhesion film; and a second protrusion and third protrusion forming step of forming at least one second protrusion by applying a second coating material to the surface having the textured structure formed thereon and of forming at least one third protrusion by applying a third coating material of a type different from the second coating material to the surface having the textured structure formed thereon, wherein, when the second protrusion and the third protrusion change to a liquid state, the second coating material and the third coating material may be mixed with each other to form an adhesive layer.

In addition, the second coating material may be at least one of 4-arm polyethylene glycol-thiosuccinimidyl glutarate and methoxy polyethylene glycol amine, and the third coating material may be at least one of L-lysine and poly(L-lysine).

The above-described technical solutions are merely illustrative and should not be construed as limiting the present invention. In addition to the exemplary embodiments described above, there may be embodiments described in the accompanying drawings and the detailed description of the invention.

Advantageous Effects

According to various embodiments of the present invention as described above, the following effects are achieved.

First, since electrospinning is performed in a state in which the biodegradable polymer solution and the crosslinking agent solution are stored in separate syringes, crosslinking of the biodegradable polymer does not occur before electrospinning is performed. In other words, since crosslinking occurs only when the biodegradable polymer solution and crosslinking agent solution discharged by electrospinning come into contact with each other, it may be possible to prevent the biodegradable polymer solution from being hardened by crosslinking before electrospinning, and to perform continuous spinning for a long time. Therefore, mass production of the anti-adhesion film is possible and workability and productivity are improved.

Second, since the process of immersing the anti-adhesion film in the crosslinking agent is not performed, loss of the biodegradable polymer during the immersion process may be prevented, and it is easy to appropriately control the content of the biodegradable polymer in the anti-adhesion film.

Third, due to process automation, mass production of the anti-adhesion film is possible, and it may be possible to produce a large-area anti-adhesion film.

Fourth, as one surface and the other surface opposite to the one surface of the anti-adhesion film are modified to be hydrophilic and hydrophobic, respectively, the one surface modified to be hydrophilic may come into contact with the region where adhesion is expected, making it easy to attach the anti-adhesion film to that region. In addition, due to the other surface modified to be hydrophobic, it may be possible to prevent the shape of the anti-adhesion film from being changed by mutual sticking of the surface portions of the film. That is, the anti-adhesion film according to various embodiments of the present invention has excellent structural stability and excellent anti-adhesion ability, and the process of attaching the anti-adhesion film is convenient, thereby improving workability.

Fifth, it may be possible to form at least one protrusion by applying various coating materials for improving adhesion force to one surface of the anti-adhesion film. The protrusions according to various embodiments of the present invention are capable of improving the adhesion force of the anti-adhesion film to the region where adhesion is expected, thereby preventing the anti-adhesion film from separating or detaching from the region, thus contributing to improving the anti-adhesion ability.

Sixth, the surface area of the one surface which is hydrophilic is increased by the textured structure formed on the one surface of the anti-adhesion film, thereby increasing the adhesion force of the anti-adhesion film to the region where adhesion is expected. When at least one protrusion is formed on the textured structure, the adhesion force of the anti-adhesion film to the region is further improved.

Seventh, when the second and third protrusions according to one embodiment of the present invention change into a liquid state, the second and third coating materials constituting the protrusions, respectively, may be mixed with each other to form an adhesive layer. Therefore, when the anti-adhesion film is used in vivo, the second and third protrusions change into a liquid state due to body temperature and water and are mixed with each other to form an adhesive layer having excellent adhesive strength, thereby improving the adhesion force of the anti-adhesion film. In addition, in situations where the anti-adhesion film is not attached to the region where adhesion is expected, the second and third protrusions remain in a solid state. Also, the anti-adhesion film is capable of forming an adhesive layer only when necessary, and thus it has excellent workability and is convenient to use.

Eighth, as at least one protrusion is formed on one surface of the anti-adhesion film according to various embodiments of the present invention, the user can easily check the attachment surface of the anti-adhesion film visually or by feeling before attaching the anti-adhesion film to the region where adhesion is expected. In other words, the anti-adhesion film is convenient to use because the user can intuitively distinguish between the hydrophilic surface and the hydrophobic surface of the anti-adhesion film.

Ninth, as the body of the anti-adhesion film is crosslinked, it may be possible to produce an anti-adhesion film whose rate of deformation by water in vivo is low, and it may be possible to control the biodegradation rate of the anti-adhesion film to a desired level.

Effects of various embodiments of the present invention are not limited to the above-mentioned effects, and other effects not mentioned herein will be clearly understood by those skilled in the art from the appended claims.

MODE FOR INVENTION

Figure 1:
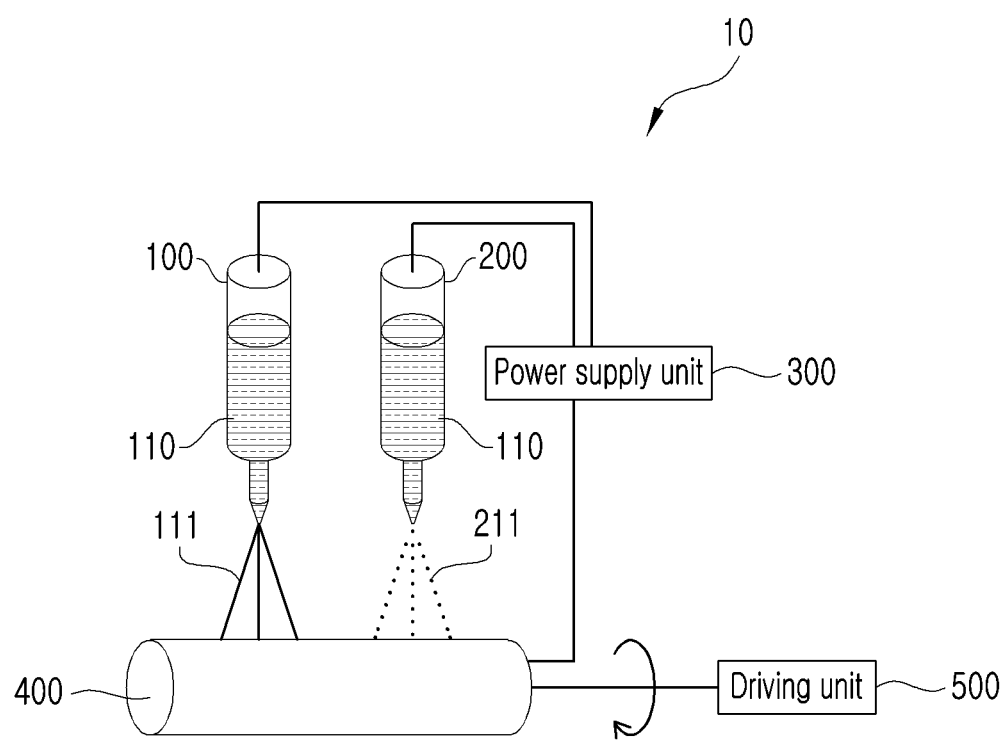
FIG. 1 is a conceptual view schematically showing the process of producing an anti-adhesion film using an electrospinning apparatus according to one embodiment of the present invention.

Preferred embodiments of the present invention will be described in more detail with reference to the accompanying drawings, but descriptions of already known technical features will be omitted or abridged for brevity of description.

It should be noted that references to "an" or "one" embodiment of the disclosure in this specification are not necessarily intended to mean the same embodiment but they mean at least one embodiment.

In the following embodiments, terms such as first and second are used for the purpose of distinguishing one component from another, but they are not to be construed in a limiting sense.

In the following embodiments, singular expressions include plural expressions unless the context clearly indicates otherwise.

In the following embodiments, terms such as "include" and "have" are intended to denote the presence of mentioned characteristics or components, but do not exclude the probability of presence or addition of one or more other characteristics or components.

In the following embodiments, when a part, such as a layer, a region, a component, or the like, is referred to as being "on" or "above" another part, it not only refers to a case where the part may be directly above the other part, but also a case where a third part is present therebetween.

In the drawings, the sizes of components may be exaggerated or reduced for convenience of description. For example, the size and thickness of each component shown in the drawings are shown as desired for convenience of description, and thus the present invention is not necessarily limited to what is shown.

When a specific embodiment may be implemented in a different manner, a particular process order may become different from a described order. For example, two consecutively described processes may be performed substantially at the same time, or may be performed in an order opposite to a described order. That is, the individual steps of each method described herein may be appropriately performed in any order, unless otherwise indicated herein or clearly contradicted by context.

FIG. 1 is a conceptual view schematically showing the process of producing an anti-adhesion film using an electrospinning apparatus according to one embodiment of the present invention. Referring to FIG. 1, in one embodiment, an electrospinning apparatus 10 may include a first syringe 100, a second syringe 200, a power supply unit 300, a collector unit 400, and a driving unit 500.

A biodegradable polymer solution 110 may be stored in the first syringe 100. A spray nozzle may be formed at one end of the first syringe 100, and the biodegradable polymer solution 110 may be discharged to the outside through the spray nozzle. A crosslinking agent solution 210 may be stored in the second syringe 200. A spray nozzle may be formed at one end of the second syringe 200, and the crosslinking agent solution 210 may be discharged to the outside through the spray nozzle.

The power supply unit 300 may apply a voltage (for example, 0.1 to 100 kV) to the spray nozzle of the first syringe 100, the spray nozzle of the second syringe 200, and the collector unit 400. The collector unit 400 is a device provided to collect the solutions discharged through the spray nozzles. Depending on the implementation, the collector unit 400 may be applied in various forms. For example, the shape of the collector unit 400 may be a flat plate or cylindrical shape having a predetermined area.

In one embodiment, when the collector unit 400 has a cylindrical shape, the driving unit 500 may rotate the collector unit 400 in one direction. In another embodiment, when the collector unit 400 has a flat plate shape, the driving unit 500 may be connected to at least one of the first syringe 100 and the second syringe 200 to move the syringe in the forward and backward or left and right directions. In another embodiment, when the collector unit 400 has a flat plate shape, the driving unit 500 may be connected to the collector unit 400 and may control the collector unit 400 to move in the forward and backward or left and right directions.

According to one embodiment, the discharge speed of the solution from each syringe, the applied voltage, the distance between the spray nozzle and the collector unit 400, the rotation speed of the collector unit 400, etc. may be flexibly changed depending on the situation. For example, during electrospinning, the rotation speed of the collector unit 400 may be adjusted to 50 to 400 rpm to create texture on the surface of the collector unit 400, or the rotation speed of the collector unit 400 may be set to 10 to 400 rpm, thereby producing an anti-adhesion film in the form of non-woven fabric without a specific texture.

Figure 2:
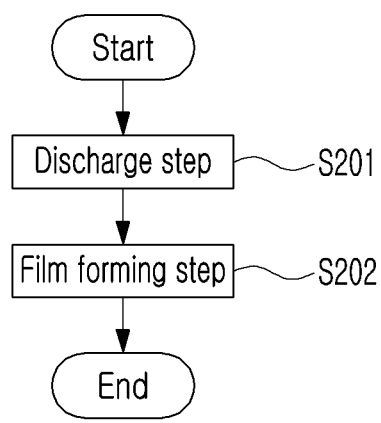
FIG. 2 is a flow chart schematically showing a method for producing an anti-adhesion film according to one embodiment of the present invention.

FIG. 2 is a flow chart schematically showing a method for producing an anti-adhesion film according to one embodiment of the present invention. The method for producing an anti-adhesion film according to one embodiment will now be described with reference to FIGS. 1 and 2 while using step numbers for convenience.

1. Discharge Step <S201>

In this step, the biodegradable polymer solution 110 filled in the first syringe 100 and the crosslinking agent solution 210 filled in the second syringe 200 may be electrospun separately. According to one embodiment, during electrospinning, the biodegradable polymer solution 110 may be discharged in the form of fibers 111 from the spray nozzle of the first syringe 100, and the crosslinking agent solution 210 having a lower viscosity than the biodegradable polymer solution 110 may be discharged in the form of droplets 211 from the spray nozzle of the second syringe 200. As used herein, the term "biodegradable" refers to the property of being able to be degraded when exposed to a physiological solution. For example, the term "biodegradable" refers to the property of being able to be degraded by body fluids or microorganisms in the living bodies of mammals, including humans.

In one embodiment, the biodegradable polymer solution 110 may include a biodegradable polymer and a solvent for the biodegradable polymer. Specifically, the biodegradable polymer may include at least one selected from the group consisting of collagen, hyaluronic acid, chitosan, and gelatin. The solvent for the biodegradable polymer is not limited to a particular type and may be any solvent capable of dissolving the biodegradable polymer. Non-limiting examples of the solvent for the biodegradable polymer include water, dimethylacetamide, 2-(N-morpholino)ethanesulfonic acid, and the like. In addition, in one embodiment, the biodegradable polymer may be included in the biodegradable polymer solution 110 at a concentration of 1 to 10 w/w %.

In one embodiment, the crosslinking agent solution 210 may include a crosslinking agent, a first solvent, and a second solvent of a type different from the first solvent. For example, the crosslinking agent may be at least one selected from the group consisting of 1-ethyl-3-(3-dimethylaminopropyl)carbodiimide, dicyclohexyl carbodiimide, polyethylene glycol diacrylate, N-hydroxysuccinimide, and combinations thereof.

In addition, in one embodiment, the concentration of the crosslinking agent in the crosslinking agent solution 210 may be 1 to 2 w/w %. As a specific example, the concentration of the crosslinking agent may be 1 w/w %, 1.1 w/w %, 1.2 w/w %, 1.3 w/w %, 1.4 w/w %, 1.5 w/w %, 1.6 w/w %, 1.7 w/w %, 1.8 w/w %, 1.9 w/w %, or 2 w/w %. In addition, the concentration of the crosslinking agent may range from a value equal to or larger than any one of the above values to a value equal to or smaller than any one of the above values.

For example, the concentration of the crosslinking agent may be in the range of 1 w/w % to 1.5 w/w %, 1.1 w/w % to 1.6 w/w %, 1.2 w/w % to 1.7 w/w %, 1.3 w/w % to 1.8 w/w %, 1.4 w/w % to 1.9 w/w %, 1.5 w/w % to 2 w/w %, or 1 w/w % to 2 w/w %. When the concentration of the crosslinking agent according to one embodiment is in the above concentration range, it may be possible to appropriately adjust the degree of crosslinking of the anti-adhesion film, thus maintaining the tensile strength and elongation of the anti-adhesion film at high levels.

If the concentration of the crosslinking agent is less than 1 w/w %, a problem may arise in that the tensile strength of the anti-adhesion film decreases; in contrast, if the concentration of the crosslinking agent is more than 2 w/w %, a problem may arise in that the elongation of the anti-adhesion film decreases and the production cost increases. For these reasons, the concentration of the crosslinking agent is preferably within the above-described range.

In one embodiment, the first solvent may be of a type that dissolves the crosslinking agent, and a non-limiting example of the first solvent may be water. In one embodiment, the second solvent may be an aprotic polar solvent, in which case it may be possible to prevent decomposition of the crosslinking agent during electrospinning or to slow down the decomposition rate of the crosslinking agent. Non-limiting examples of aprotic polar solvents include dimethylacetamide, dimethylformamide, dimethyl sulfoxide, and the like.

According to one embodiment, when the total amount of the first solvent and the second solvent in the crosslinking solution is 100 parts by weight, the first solvent may be applied in an amount of 30 to 70 parts by weight. As a specific example, the first solvent may be used in an amount of 30 parts by weight, parts by weight, 50 parts by weight, 60 parts by weight, or 70 parts by weight. In addition, the content of the first solvent may range from a value equal to or larger than any one of the above values to a value equal to or smaller than any one of the above values.

For example, the content of the first solvent may be in the range of 30 parts by weight to 50 parts by weight, 40 parts by weight to 60 parts by weight, 50 parts by weight to 70 parts by weight, or 30 parts by weight to 70 parts by weight. In one embodiment, when the content of the first solvent is within the above range, smooth electrospinning is possible and the physical properties of the anti-adhesion film may be maintained at high levels.

If the content of the first solvent is less than 30 parts by weight, a problem may arise in that, as the content of the second solvent relatively increases, the second solvent modifies the structure of the biodegradable polymer, thus reducing the physical properties of the anti-adhesion film; in contrast, if the content of the first solvent is more than 70 parts by weight, a problem may arise in that it is difficult to discharge the crosslinking agent solution during electrospinning. For these reasons, the content of the first solvent is preferably within the above-described range.

According to one embodiment, when the total amount of the first solvent and the second solvent in the crosslinking agent solution is 100 parts by weight, the second solvent may be applied in an amount of 30 to 70 parts by weight. As a specific example, the second solvent may be used in an amount of 30 parts by weight, 40 parts by weight, 50 parts by weight, 60 parts by weight, or 70 parts by weight. Additionally, the content of the second solvent may range from a value equal to or larger than any one of the above values to a value equal to or smaller than any one of the above values.

For example, the content of the second solvent may be in the range of 30 parts by weight to 50 parts by weight, 40 parts by weight to 60 parts by weight, 50 parts by weight to 70 parts by weight, or 30 parts by weight to 70 parts by weight. In one embodiment, when the content of the second solvent is within the above range, smooth electrospinning is possible and the physical properties of the anti-adhesion film may be maintained at high levels.

If the content of the second solvent is less than 30 parts by weight, a problem may arise in that, as the content of the first solvent relatively increases, it is difficult to discharge the crosslinking agent solution during electrospinning; in contrast, if the content of the second solvent is more than 70 parts by weight, a problem may arise in that the second solvent modifies the structure of the biodegradable polymer, thus reducing the physical properties of the anti-adhesion film. For these reasons, the content of the second solvent is preferably within the above-described range.

2. Film Forming Step <S202>

In this step, the biodegradable polymer solution 110 discharged in the form of fibers 111 in step S201 and the crosslinking agent solution 210 discharged in the form of droplets 211 in step S201 may meet and contact each other on the surface of the collector unit 400, and crosslinking of the biodegradable polymer may occur, thereby forming an anti-adhesion film.

Figure 3:
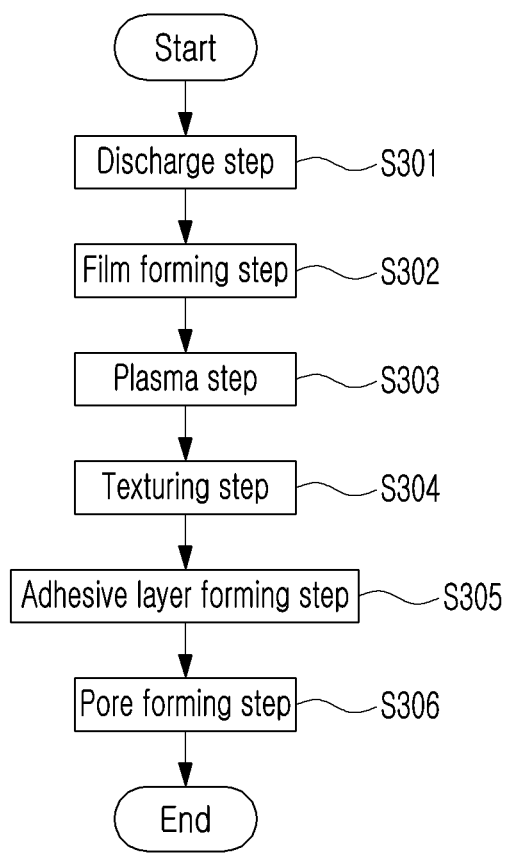
FIG. 3 is a flow chart schematically showing a method for producing an anti-adhesion film according to another embodiment of the present invention.
Figure 4:
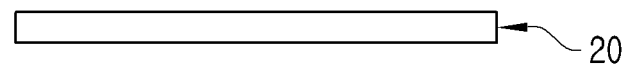
FIG. 4 is a conceptual view schematically showing the method for producing an anti-adhesion film shown in FIG. 3.
Figure 4:
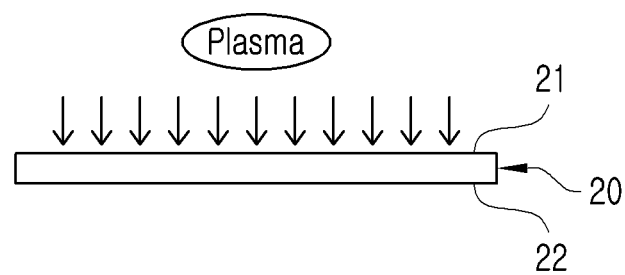
Figure 4:
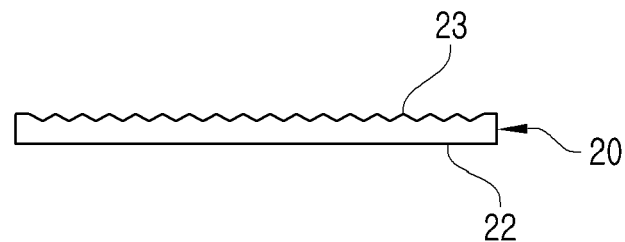
Figure 4:
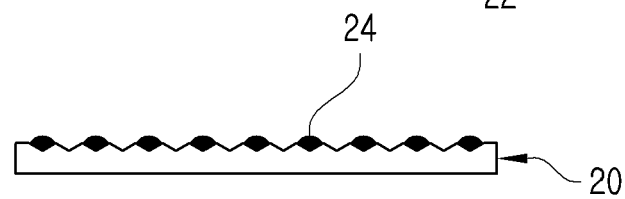
Figure 4:
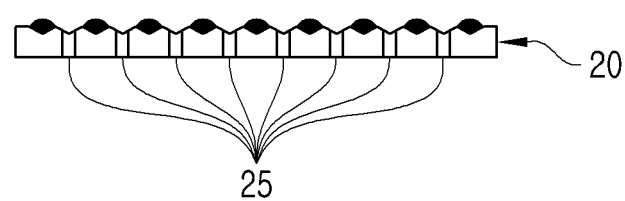

Hereinafter, redundant descriptions for parts that are the same as or equivalent to the above-described method for producing an anti-adhesion film will be omitted, and the description will focus on the differences. FIG. 3 is a flow chart schematically showing a method for producing an anti-adhesion film according to another embodiment of the present invention, and FIG. 4 is a conceptual view schematically showing the method for producing an anti-adhesion film shown in FIG. 3. The method for producing an anti-adhesion film according to one embodiment will now be described with reference to FIGS. 3 and 4 while using step numbers for convenience.

1. Discharge Step <S301>

In this step, the biodegradable polymer solution 110 filled in the first syringe 100 and the crosslinking agent solution 210 filled in the second syringe 200 may be electrospun separately. According to one embodiment, during electrospinning, the biodegradable polymer solution 110 may be discharged in the form of fibers 111 from the spray nozzle of the first syringe 100, and the crosslinking agent solution 210 may be discharged in the form of droplets 211 from the spray nozzle of the second syringe 200.

2. Film Forming Step <S302>

In this step, the biodegradable polymer solution 110 discharged in the form of fibers 111 in step S301 and the crosslinking agent solution 210 discharged in the form of droplets 211 in step S301 may meet and contact each other on the surface of the collector unit 400, and crosslinking of the biodegradable polymer may occur, thereby forming an anti-adhesion film 20 shown in (a) of FIG. 4.

3. Plasma Step <S303>

In this step, one surface 21 of the anti-adhesion film 20 produced in step S302 or the other surface 22 opposite to the one surface 21 may be modified by plasma treatment. As shown in (b) of FIG. 4, surface modification may be achieved by plasma treatment of the one surface 21 of the anti-adhesion film 20.

As a specific example, in the case in which the anti-adhesion film 20 is produced using collagen, both the one surface 21 and the other surface 22 of the anti-adhesion film 20 are hydrophobic before plasma treatment; however, when the one surface 21 of the anti-adhesion film 20 is treated with plasma, the surface may be modified from hydrophobic to hydrophilic.

In this case, the type of treatment gas that is used for plasma treatment may be argon (Ar), oxygen ($O_2$), or nitrogen ($N_2$), the gas may be supplied at a flow rate of 10 to 100 SCCM, the pressure in the plasma reaction chamber may be 50 to 80 mTorr, the plasma treatment time may be set to 20 to 100 seconds, and power may be set to 100 to 300 W, without being limited thereto. Process conditions, including the type of gas that is used for plasma treatment, flow rate, treatment pressure, treatment time, and power, may be flexibly changed depending on the degree and nature of surface modification.

In this step, hydrophilicity or hydrophobicity may be imparted only to a specific surface of the anti-adhesion film 20 by plasma treatment. Through this step, the one surface 21 and the other surface 22 of the anti-adhesion film 20 may easily have different natures, and thus it may be possible to produce an anti-adhesion film 20 that has both hydrophilic and hydrophobic natures.

In one embodiment, when an anti-adhesion film is produced using hydrophobic collagen, one surface of the cross-linked collagen film may be modified to be hydrophilic by plasma treatment. In another embodiment, when an anti-adhesion film is produced using hydrophilic hyaluronic acid, one surface of the crosslinked hyaluronic acid film may be modified to be hydrophobic by plasma treatment.

4. Texturing Step <S304>

In this step, a textured structure 23 may be formed on one surface 21 or the other surface 22 of the anti-adhesion film 20. As shown in (c) of FIG. 4, in one embodiment, one surface 21 of the anti-adhesion film 20 may be plasma-treated to form a textured structure 23 on the one surface 21.

As a specific example, during plasma treatment, it may be possible to form the textured structure 23 on the one surface 21, which is hydrophilic, by adjusting the intensity of the plasma or appropriately setting the duration of the generated plasma. In addition, depending on the implementation, the textured structure 23 on the one surface 21 may also be formed by other known processes such as laser etching, sand blasting, shot peening, water jetting, pressing, rolling, cutting, etc.

5. Adhesive Layer Forming Step <S305>

In this step, an adhesive layer may be formed by applying a first coating material 24 in a dot pattern to the one surface 21 or the other surface 22 of the anti-adhesion film 20. As shown in (d) of FIG. 4, in one embodiment, the first coating material 24 is a biocompatible material that imparts an adhesive property to the one surface 21 of the anti-adhesion film 20 so that the one side 21 may be attached closely to the region where adhesion is expected. This first coating material 24 may be at least one selected from the group consisting of collagen, hyaluronic acid, chitosan, and gelatin.

In this step, various known application methods such as screen printing, spray spraying, slot die coating, gravure coating, knife coating, bar coating, etc. may be used to apply the first coating material 24 to a specific region of the one surface 21 of the anti-adhesion film 20.

When the one surface 21 of the anti-adhesion film 20 according to one embodiment is attached to the region where adhesion is expected, the one surface 21 may be easily attached to the region where adhesion is expected because the one surface 21 is hydrophilic. In addition, a plurality of dots of the first coating material 24 formed on the one surface 21 further strengthen the adhesive property of the anti-adhesion film 20 and help the anti-adhesion film 20 to be attached closely to the region where adhesion is expected.

For example, when a plurality of dots of the first coating material 24 formed on the one surface 21 of the anti-adhesion film 20 are attached to the region where adhesion is expected, the plurality of dots of the first coating material 24 may be dissolved by body temperature and water originating from surrounding tissues and change into a liquid state, thus forming an adhesive layer and attaching to the region where adhesion is expected, and thus the anti-adhesion film 20 may be attached closely to the region where adhesion is expected. In this case, since the anti-adhesion film 20 has a plurality of crosslinked structures formed therein, the anti-adhesion film 20 may maintain its appearance for a specific period of time without being easily deformed or biodegraded by water, and may function as a physical barrier.

In this step, the surface area of the one surface 21 is increased by the textured structure 23, and thus when the first coating material 24 is applied onto the textured structure 23, the first coating material 24 may be firmly attached to the one surface 21 due to the increased contact area between the first coating material 24 and the textured structure 23.

6. Pore Forming Step <S306>

In this step, as shown in (e) of FIG. 4, one or more pores 25 may be formed in the anti-adhesion film 20. In this step, fine pores may be formed by irradiating the surface of the anti-adhesion film 20 with a laser or by using a known perforation method (for example, shot peening). In one embodiment, the pores 25 may have an average diameter that allows only water or body fluids to pass therethrough, but does not allow cells or tissues to pass therethrough. For example, the pores 25 may be nanometer-sized fine pores.

Figure 5:
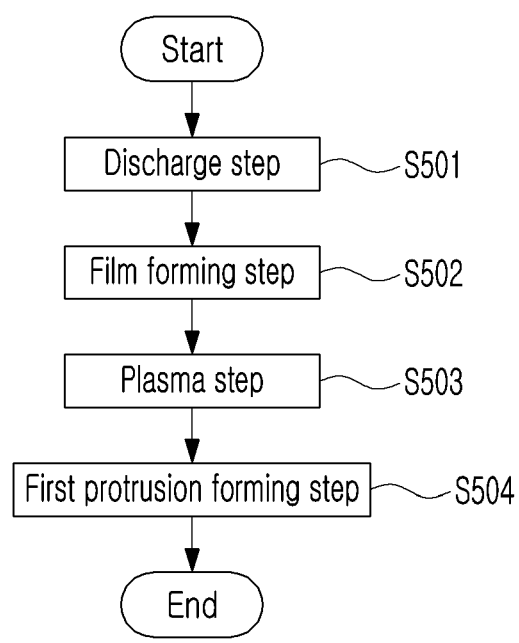
FIG. 5 is a flow chart schematically showing a method for producing an anti-adhesion film according to another embodiment of the present invention.
Figure 6:
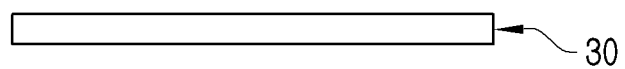
FIG. 6 is a conceptual view schematically showing the method for producing an anti-adhesion film shown in FIG. 5.
Figure 6:
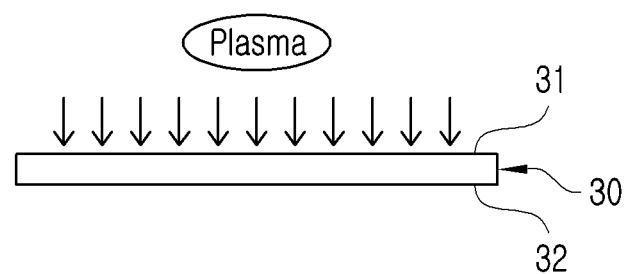
Figure 6:
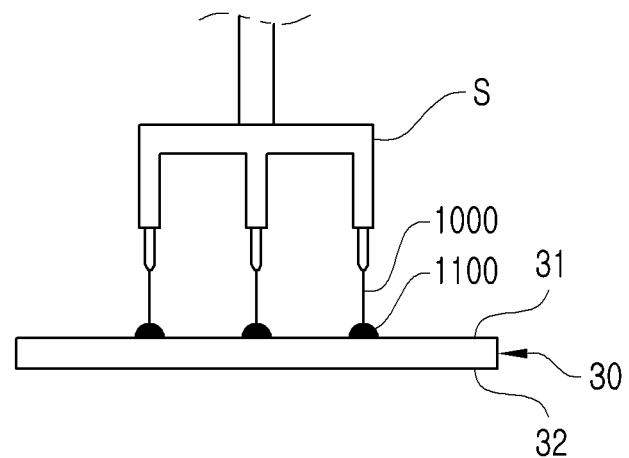

FIG. 5 is a flow chart schematically showing a method for producing an anti-adhesion film according to another embodiment of the present invention, and FIG. 6 is a conceptual view schematically showing the method for producing an anti-adhesion film shown in FIG. 5. The method for producing an anti-adhesion film according to one embodiment will now be described with reference to FIGS. 5 and 6 while using step numbers for convenience.

1. Discharge Step <S501>

In this step, the biodegradable polymer solution 110 filled in the first syringe 100 and the crosslinking agent solution 210 filled in the second syringe 200 may be electrospun separately. According to one embodiment, during electrospinning, the biodegradable polymer solution 110 may be discharged in the form of fibers 111 from the spray nozzle of the first syringe 100, and the crosslinking agent solution 210 may be discharged in the form of droplets 211 from the spray nozzle of the second syringe 200.

2. Film Forming Step <S502>

In this step, the biodegradable polymer solution 110 discharged in the form of fibers 111 in step S501 and the crosslinking agent solution 210 discharged in the form of droplets 211 in step S501 may meet and contact each other on the surface of the collector unit 400, and crosslinking of the biodegradable polymer may occur, thereby forming an anti-adhesion film 30 shown in (a) of FIG. 6.

3. Plasma Step <S503>

In this step, one surface 31 of the anti-adhesion film 30 produced in step S502 or the other surface 22 opposite to the one surface 21 may be modified by plasma treatment. As shown in (b) of FIG. 6, surface modification to hydrophilic or hydrophobic state may be achieved by plasma treatment of the one surface 31 of the anti-adhesion film 30.

4. First Protrusion Forming Step <S504>

In this step, at least one first protrusion 1100 may be formed by applying a first coating material 1000 to the one surface 31 or the other surface 32 of the anti-adhesion film 30. In step S503, the first coating material 1000 may be applied to the one surface 31, which has been modified to be hydrophilic by plasma treatment, through a spray device S, and the applied first coating material 1000 may be dried for a predetermined time, thereby forming at least one first protrusion 1100. As shown in (c) of FIG. 6, in this step, after the first coating material 1000 is applied to specific points on the one surface 31 of the anti-adhesion film 30, a plurality of first protrusions 1100 may be formed on the one surface 31. In this case, the first coating material 1000 may be at least one selected from the group consisting of collagen, hyaluronic acid, chitosan, and gelatin.

Figure 7:
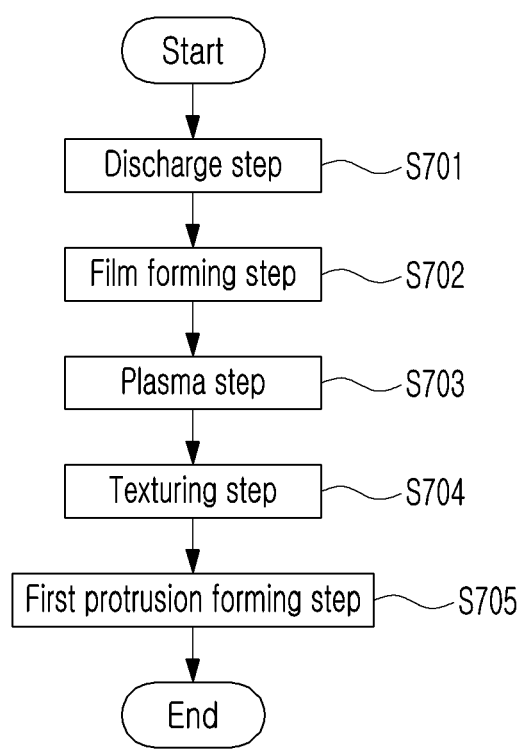
FIG. 7 is a flow chart schematically showing a method for producing an anti-adhesion film according to another embodiment of the present invention.
Figure 8:
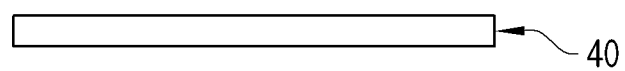
FIG. 8 is a conceptual view schematically showing the method for producing an anti-adhesion film shown in FIG. 7.
Figure 8:
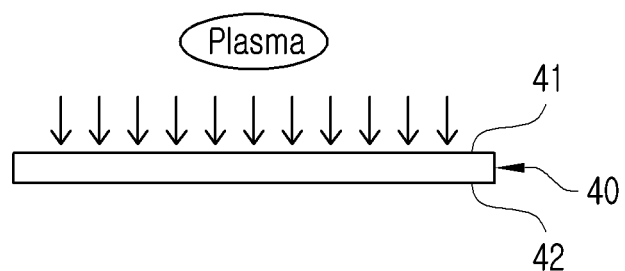
Figure 8:
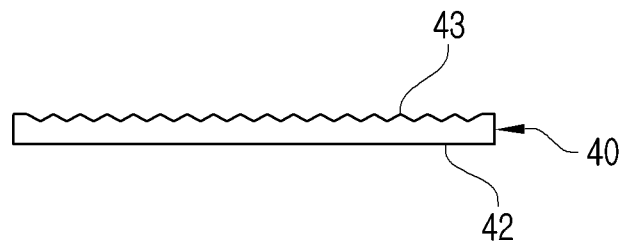
Figure 8:
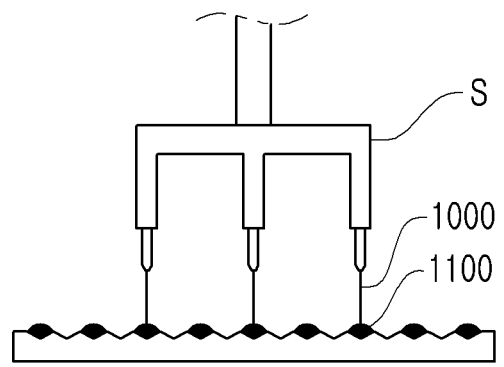

FIG. 7 is a flow chart schematically showing a method for producing an anti-adhesion film according to another embodiment of the present invention, and FIG. 8 is a conceptual view schematically showing the method for producing an anti-adhesion film shown in FIG. 7. The method for producing an anti-adhesion film according to one embodiment will now be described with reference to FIGS. 7 and 8 while using step numbers for convenience.

1. Discharge Step <S701>

In this step, the biodegradable polymer solution 110 filled in the first syringe 100 and the crosslinking agent solution 210 filled in the second syringe 200 may be electrospun separately. According to one embodiment, during electrospinning, the biodegradable polymer solution 110 may be discharged in the form of fibers 111 from the spray nozzle of the first syringe 100, and the crosslinking agent solution 210 may be discharged in the form of droplets 211 from the spray nozzle of the second syringe 200.

2. Film Forming Step <S702>

In this step, the biodegradable polymer solution 110 discharged in the form of fibers 111 in step S701 and the crosslinking agent solution 210 discharged in the form of droplets 211 in step S701 may meet and contact each other on the surface of the collector unit 400, and crosslinking of the biodegradable polymer may occur, thereby forming an anti-adhesion film 40 shown in (a) of FIG. 8.

3. Plasma Step <S703>

In this step, one surface 41 of the anti-adhesion film 40 produced in step S702 or the other surface 42 opposite to the one surface 41 may be modified by plasma treatment. As shown in (b) of FIG. 8, surface modification to hydrophilic or hydrophobic state may be achieved by plasma treatment of the one surface 41 of the anti-adhesion film 40.

4. Texturing Step <S704>

In this step, a textured structure 43 may be formed on the one surface 41 or the other surface 42 of the anti-adhesion film 20. As shown in (c) of FIG. 8, in one embodiment, the one surface 41 of the anti-adhesion film 20 may be plasma-treated to form a textured structure 23 on the one surface 41.

5. First Protrusion Forming Step <S705>

In this step, at least one first protrusion 1100 may be formed by applying a first coating material 1000 to the one surface having the textured structure 43 formed thereon. In step S704, the first coating material 1000 may be applied to the one surface 41, which has the textured structure 43 formed thereon, through a spray device S, and the applied first coating material 1000 may be dried for a predetermined time, thereby forming at least one first protrusion 1100. As shown in (d) of FIG. 8, in this step, after the first coating material 1000 is applied to specific points on the one surface 41 of the anti-adhesion film 40, a plurality of first protrusions 1100 may be formed on the one surface 41. In this case, the first coating material 1000 may be at least one selected from the group consisting of collagen, hyaluronic acid, chitosan, and gelatin.

Figure 9:
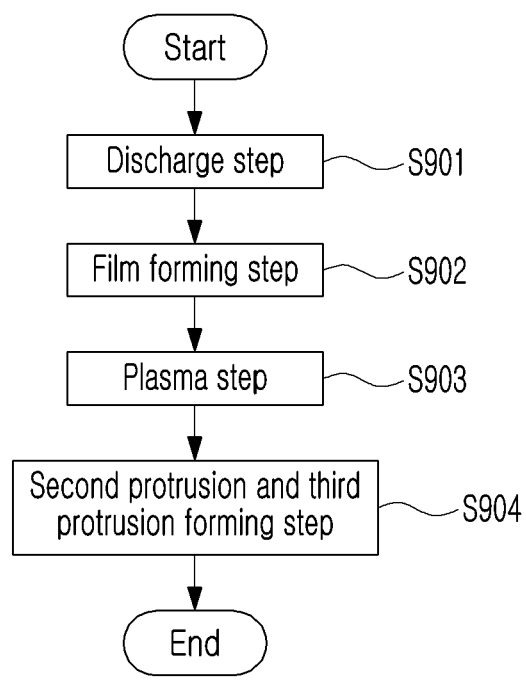
FIG. 9 is a flow chart schematically showing a method for producing an anti-adhesion film according to another embodiment of the present invention.
Figure 10:
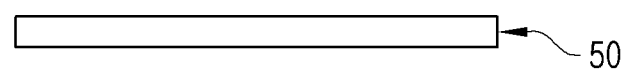
FIG. 10 is a conceptual view schematically showing the method for producing an anti-adhesion film shown in FIG. 9.
Figure 10:
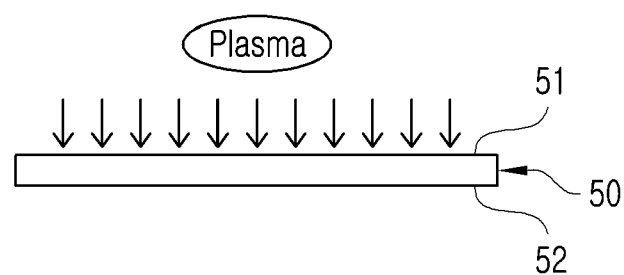
Figure 10:
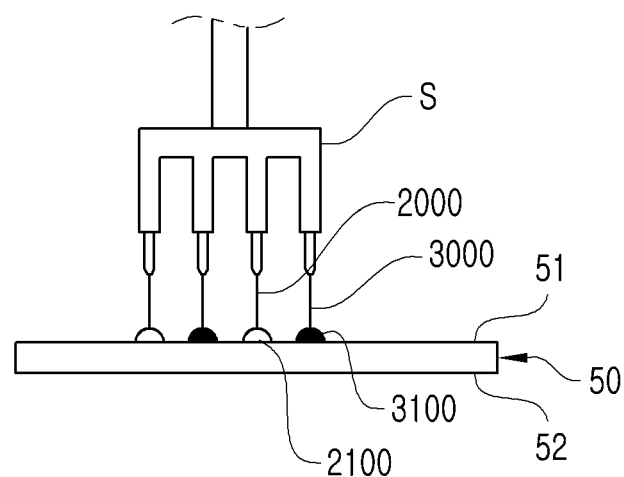
Figure 10:
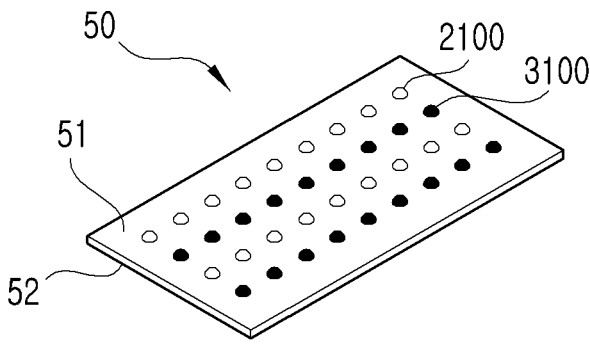

FIG. 9 is a flow chart schematically showing a method for producing an anti-adhesion film according to another embodiment of the present invention, and FIG. 10 is a conceptual view schematically showing the method for producing an anti-adhesion film shown in FIG. 9. The method for producing an anti-adhesion film according to one embodiment will now be described with reference to FIGS. 7 and 8 while using step numbers for convenience.

1. Discharge Step <S901>

In this step, the biodegradable polymer solution 110 filled in the first syringe 100 and the crosslinking agent solution 210 filled in the second syringe 200 may be electrospun separately. According to one embodiment, during electrospinning, the biodegradable polymer solution 110 may be discharged in the form of fibers 111 from the spray nozzle of the first syringe 100, and the crosslinking agent solution 210 may be discharged in the form of droplets 211 from the spray nozzle of the second syringe 200.

2. Film Forming Step <S902>

In this step, the biodegradable polymer solution 110 discharged in the form of fibers 111 in step S901 and the crosslinking agent solution 210 discharged in the form of droplets 211 in step S901 may meet and contact each other on the surface of the collector unit 400, and crosslinking of the biodegradable polymer may occur, thereby forming an anti-adhesion film 50 shown in (a) of FIG. 10.

3. Plasma Step <S903>

In this step, one surface 51 of the anti-adhesion film 50 produced in step S902 or the other surface 52 opposite to the one surface 51 may be modified by plasma treatment. As shown in (b) of FIG. 10, surface modification to hydrophilic or hydrophobic state may be achieved by plasma treatment of the one surface 51 of the anti-adhesion film 50.

4. Second Protrusion and Third Protrusion Forming Step <S904>

In this step, at least one second protrusion 2100 may be formed by applying a second coating material 2000 to the one surface 51 or the other surface 52 of the anti-adhesion film 50, and at least one third protrusion 3100 may be formed by applying a third coating material 3000 of a type different from the second coating material 2000 to the surface having the second protrusion 2100 formed thereon.

As shown in (c) of FIG. 10, the second coating material 2000 may be applied to a specific point on the one surface 51 of the anti-adhesion film 50 and dried for a predetermined of time, thereby forming at least one second protrusion 2100. In this case, the second coating material 2000 is a polyethylene glycol-based material and may be at least one of 4-arm polyethylene glycol-thiosuccinimidyl glutarate and methoxy polyethylene glycol amine (mPEG-amine).

As shown in (c) of FIG. 10, the third coating material 3000 of a type different from the second coating material 2000 may be applied to a specific point on the one surface 51 of the anti-adhesion film 50 and dried for a predetermined of time, thereby forming at least one third protrusion 3100. In this case, the third coating material 3000 is a lysine-based amino acid and may be at least one of L-lysine and poly(L-lysine). When the second protrusion 2100 and the third protrusion 3100 change to a liquid state, the second coating material 2000 and the third coating material 3000 may be mixed with each other and quickly gelated by crosslinking, thereby forming an adhesive layer having a strong adhesive force.

Meanwhile, when the coating materials are applied by the spray device S in this step, the second coating material 2000 and the third coating material 3000 may be applied separately so as not to overlap each other, as shown in (d) of FIG. 10. In addition, depending on the implementation, it is also possible that the points to which the second coating material 2000 and the third coating material 3000 are applied overlap each other. For example, when the third coating material 3000 is applied onto the point where the second protrusion 2100 has been formed, the second protrusion 2100 and the third protrusion 3100 may overlap each other to form a laminated structure.

Figure 11:
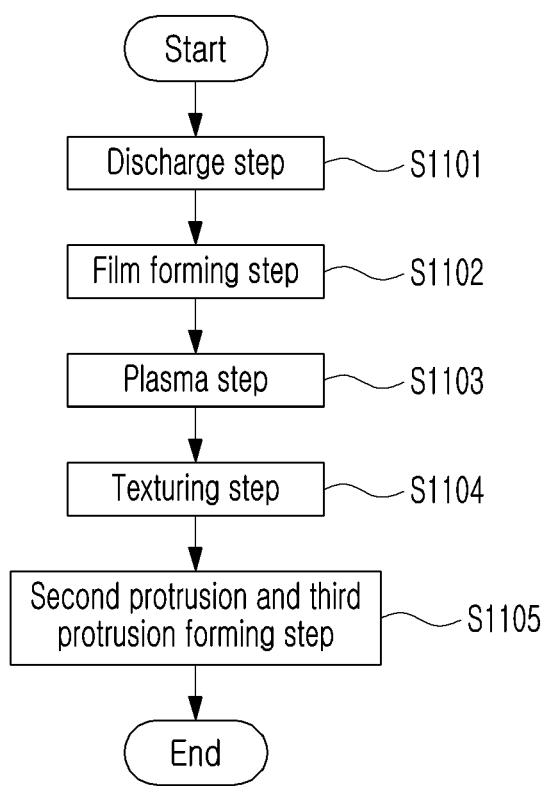
FIG. 11 is a flow chart schematically showing a method for producing an anti-adhesion film according to another embodiment of the present invention.
Figure 12:
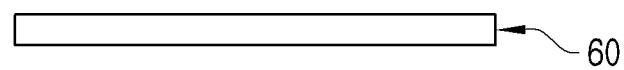
FIG. 12 is a conceptual view schematically showing the method for producing an anti-adhesion film shown in FIG. 11.
Figure 12:
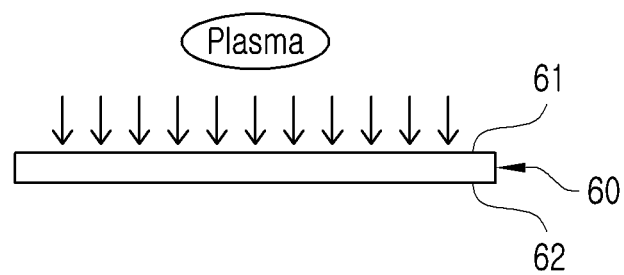
Figure 12:
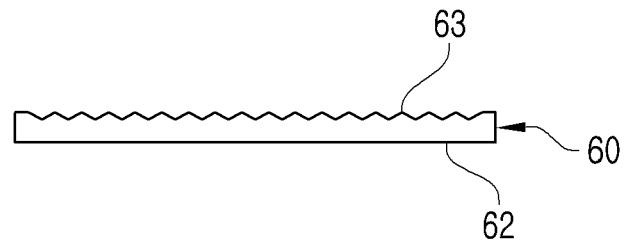
Figure 12:
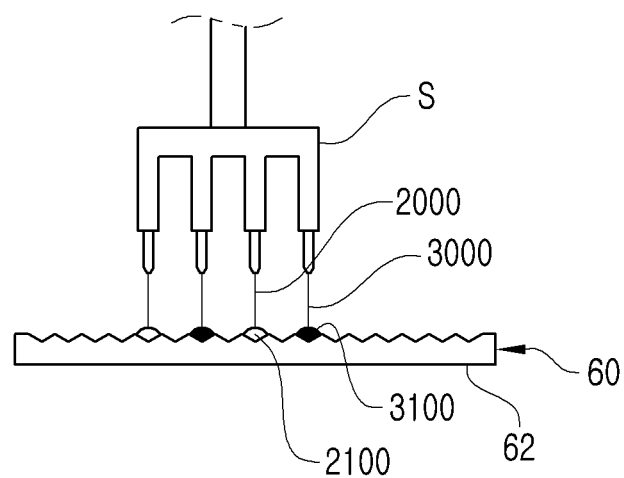

FIG. 11 is a flow chart schematically showing a method for producing an anti-adhesion film according to another embodiment of the present invention, and FIG. 12 is a conceptual view schematically showing the method for producing an anti-adhesion film shown in FIG. 11. The method for producing an anti-adhesion film according to another embodiment will now be described with reference to FIGS. 11 and 12 while using step numbers for convenience.

1. Discharge Step <S1101>

In this step, the biodegradable polymer solution 110 filled in the first syringe 100 and the crosslinking agent solution 210 filled in the second syringe 200 may be electrospun separately. According to one embodiment, during electrospinning, the biodegradable polymer solution 110 may be discharged in the form of fibers 111 from the spray nozzle of the first syringe 100, and the crosslinking agent solution 210 may be discharged in the form of droplets 211 from the spray nozzle of the second syringe 200.

2. Film Forming Step <S1102>

In this step, the biodegradable polymer solution 110 discharged in the form of fibers 111 in step S1101 and the crosslinking agent solution 210 discharged in the form of droplets 211 in step S1101 may meet and contact each other on the surface of the collector unit 400, and crosslinking of the biodegradable polymer may occur, thereby forming an anti-adhesion film 60 shown in (a) of FIG. 12.

3. Plasma Step <S1103>

In this step, one surface 61 of the anti-adhesion film 60 produced in step S1102 or the other surface 62 opposite to the one surface 61 may be modified by plasma treatment. As shown in (b) of FIG. 12, surface modification to hydrophilic or hydrophobic state may be achieved by plasma treatment of the one surface 61 of the anti-adhesion film 60.

4. Texturing Step <S1104>

In this step, a textured structure 63 may be formed on the one surface 61 or the other surface 62 of the anti-adhesion film 60. As shown in (c) of FIG. 12, in one embodiment, the one surface 61 of the anti-adhesion film 60 may be plasma-treated to form a textured structure 63 on the one surface 61.

5. Second Protrusion and Third Protrusion Forming Step <S1105>

In this step, at least one second protrusion 2100 may be formed by applying a second coating material 2000 to the surface on which the textured surface has been formed in step S1104, and at least one third protrusion 3100 may be formed by applying a third coating material 3000 of a type different from the second coating material 2000 to the surface having the textured structure 63 formed thereon.

As shown in (d) of FIG. 12, the second coating material 2000 may be applied to a specific point on the textured structure 63 and dried for a predetermined of time, thereby forming at least one second protrusion 2100. In this case, the second coating material 2000 is a polyethylene glycol-based material and may be at least one of 4-arm polyethylene glycol-thiosuccinimidyl glutarate and methoxy polyethylene glycol amine (mPEG-amine).

As shown in (d) of FIG. 12, the third coating material 3000 of a type different from the second coating material 2000 may be applied to a specific point on the textured structure 63 and dried for a predetermined of time, thereby forming at least one third protrusion 3100. In this case, the third coating material 3000 is a lysine-based amino acid and may be at least one of L-lysine and poly(L-lysine). When the second protrusion 2100 and the third protrusion 3100 change to a liquid state, the second coating material 2000 and the third coating material 3000 may be mixed with each other and quickly gelated by crosslinking, thereby forming an adhesive layer having a strong adhesive force.

Meanwhile, when the coating materials are applied by the spray device S in this step, the second coating material 2000 and the third coating material 3000 may be applied separately so as not to overlap each other. In addition, depending on the implementation, it is also possible that the points to which the second coating material 2000 and the third coating material 3000 are applied overlap each other. For example, when the third coating material 3000 is applied onto the point where the second protrusion 2100 has been formed, the second protrusion 2100 and the third protrusion 3100 may overlap each other to form a laminated structure. In one embodiment, the third protrusion 3100 may be formed on the one surface 61 at a predetermined distance from the second protrusion 2100, but the formation positions of the second protrusion 2100 and the third protrusion 3100 are necessarily limited to specific positions, and may be changed as needed by those skilled in the art.

Figure 13:
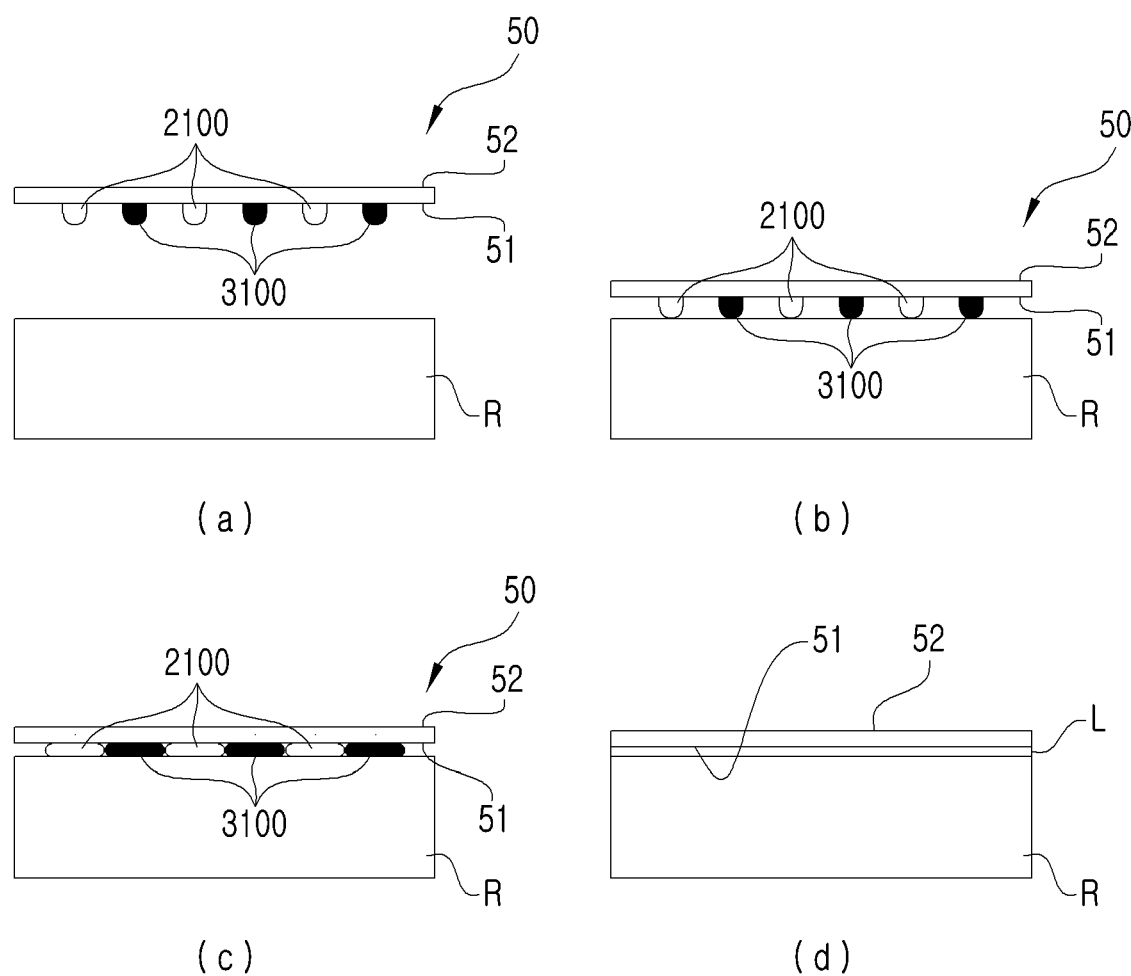
FIG. 13 schematically shows the process in which an adhesive layer is formed when the anti-adhesion film according to one embodiment of the present invention is attached to the region where adhesion is expected.

FIG. 13 schematically shows the process in which an adhesive layer is formed when the anti-adhesion film according to one embodiment of the present invention is attached to the region where adhesion is expected. The second protrusion 2100 and the third protrusion 3100 according to one embodiment, which maintain a solid state at room temperature (for example, 25 to 28° C.), may undergo a phase change to a solid state when reach a specific temperature (for example, 36 to 38° C.) or when absorb a specific amount of water. That is, when the second protrusion 2100 and the third protrusion 3100 change to a liquid state, the second coating material 2000 constituting the second protrusion 2100 and the third coating material 3000 constituting the third protrusion 3100 may be mixed together to form an adhesive layer (L) on the one side 51. Referring to FIG. 13, when the one side 51 of the anti-adhesion film 50 is attached so as to face an attachment region (R), a plurality of second protrusions 2100 and third protrusions 3100 present on the one side 51 comes into contact with the attachment region (R). After a specific time, the second protrusion 2100 and the third protrusion 3100, which are in contact with the attachment region (R), absorb the water present in the surrounding tissue and change into a liquid state due to body temperature, and at the same time, mixing between the second coating material 2000 and the third coating material 3000 occurs, and an adhesive layer (L) is formed between the attachment region (R) and the one surface 51 through mixing between the different coating materials.

Hereinafter, the present invention will be described in more detail with reference to specific production examples and experimental examples. It is to be understood that the following production examples and experimental examples are only examples to assist in understanding of the present invention, and the scope of the present invention is not restricted or limited thereto.

Production of Anti-Adhesion Films

Production Examples 1 to 3 and Comparative Examples 1 and 2

A biodegradable polymer solution was prepared by dissolving the raw material collagen at a concentration of 1 w/w % (1 g of raw material collagen in 99 g of water) and filled into a first syringe of an electrospinning apparatus. Each crosslinking agent solution was prepared by mixing a crosslinking agent (1-ethyl-3-(3-dimethylaminopropyl)carbodiimide), a first solvent (water), and a second solvent (dimethylformamide). Each crosslinking agent solution was prepared using the crosslinking agent concentration and solvent contents shown in Table 1 below, and the prepared crosslinking agent solution was filled into a second syringe of the electrospinning apparatus.

Thereafter, electrospinning was performed under the following conditions, thereby producing a crosslinked anti-adhesion film (film thickness: 1,000 µm) on the surface of the collector unit 400: application voltage: 400 to 5,000 V; discharge rate from the syringe: 1 to 10 ml/hr; rotation speed of the collector unit 400: 10 to 500 rpm; and the distance between the spray nozzle of the syringe and the collector unit: 15 cm. The crosslinked anti-adhesion film was washed with 500 to 1000 ml of distilled water at room temperature for 60 minutes, and the washing was repeated 6 times, followed by drying, thereby producing an anti-adhesion film.

TABLE 1

|  | Production Example 1 | Production Example 2 | Production Example 3 | Comparative Example 1 | Comparative Example 2 |
|---|---|---|---|---|---|
| Crosslinking agent concentration (w/w %) | 1 | 1.5 | 2 | 0.5 | 2.5 |
| First solvent (g) | 50 | 50 | 50 | 50 | 50 |
| Second solvent (g) | 50 | 50 | 50 | 50 | 50 |

Production Examples 4 to 8 and Comparative Examples 3 and 4

Anti-adhesion films were produced in the same manner as in Production Example 1, except that the crosslinking agent solutions were prepared using the crosslinking agent concentrations and solvent contents shown in Table 2 below:

TABLE 2

|  | Production Example 4 | Production Example 5 | Production Example 6 | Production Example 7 | Production Example 8 | Comparative Example 3 | Comparative Example 4 |
|---|---|---|---|---|---|---|---|
| Crosslinking agent concentration (w/w %) | 1 | 1 | 1 | 1 | 1 | 1 | 1 |
| First solvent (g) | 30 | 40 | 50 | 60 | 70 | 20 | 80 |
| Second solvent (g) | 70 | 60 | 50 | 40 | 30 | 80 | 20 |

Production Examples 9 to 13 and Comparative Examples 5 and 6

Anti-adhesion films were produced in the same manner as in Production Example 1, except that the crosslinking agent solutions were prepared using the crosslinking agent concentrations and solvent contents shown in Table 3 below:

TABLE 3

|  | Production Example 9 | Production Example 10 | Production Example 11 | Production Example 12 | Production Example 13 | Comparative Example 5 | Comparative Example 6 |
|---|---|---|---|---|---|---|---|
| Crosslinking agent concentration (w/w%) | 2 | 2 | 2 | 2 | 2 | 2 | 2 |
| First solvent (g) | 30 | 40 | 50 | 60 | 70 | 20 | 80 |
| Second solvent (g) | 70 | 60 | 50 | 40 | 30 | 80 | 20 |

Evaluation of Physical Properties of Anti-Adhesion Films

The tensile strength of the anti-adhesion film produced in each of the Examples and the Comparative Examples was measured according to ASTM D638 standards, and the measured values are shown in Table 4 below. In addition, the elongation at break of each anti-adhesion film was measured according to ASTM D412 standards while pulling each anti-adhesion film at an elongation speed of 200 mm/min using a universal testing machine (UTM) at 23° C., and the measured values are shown in Table 4, Table 5 and Table 6 below:

TABLE 4

|  | Production Example 1 | Production Example 2 | Production Example 3 | Comparative Example 1 | Comparative Example 2 |
|---|---|---|---|---|---|
| Tensile strength (MPa) | 25 | 35 | 40 | 10 | 40 |
| Elongation (%) | 250 | 200 | 100 | 300 | 80 |

As shown in Table 4 above, it was confirmed that the anti-adhesion films of Production Examples 1 to 3 had excellent tensile strength and elongation, whereas the film of Comparative Example 1 had poor tensile strength, which does not satisfy the tensile strength level required for an anti-adhesion film, and the film of Comparative Example 2 had high tensile strength, but had low elongation and poor elasticity, indicating that it is unsuitable as an anti-adhesion film.

TABLE 5

|  | Production Example 4 | Production Example 5 | Production Example 6 | Production Example 7 | Production Example 8 | Comparative Example 3 | Comparative Example 4 |
|---|---|---|---|---|---|---|---|
| Tensile strength (MPa) | 25 | 27 | 35 | 25 | 20 | 13 | 12 |
| Elongation(%) | 250 | 300 | 350 | 300 | 270 | 250 | 200 |

As shown in Table 5 above, it was confirmed that the anti-adhesion films of Production Examples 4 to 8 had excellent tensile strength and elongation, whereas in the case of Comparative Example 3, the excessively added second solvent in the crosslinking agent solution modified the structure of the biodegradable polymer during crosslinking, negatively affecting the tensile strength of the anti-adhesion film, and in the case of Comparative Example 4, due to the excessively added first solvent, the discharge of the crosslinking agent solution from the spray nozzle during electrospinning was not smooth, and thus crosslinking was limited and the physical properties of the anti-adhesion film were reduced.

TABLE 6

|  | Production Example 9 | Production Example 10 | Production Example 11 | Production Example 12 | Production Example 13 | Comparative Example 5 | Comparative Example 6 |
|---|---|---|---|---|---|---|---|
| Tensile strength (MPa) | 25 | 22 | 20 | 17 | 15 | 13 | 12 |
| Elongation(%) | 250 | 270 | 280 | 290 | 300 | 320 | 340 |

As shown in Table 6 above, it was confirmed that the anti-adhesion films of Production Examples 9 to 13 had excellent tensile strength and elongation, whereas in the case of Comparative Example 5, the excessively added second solvent in the crosslinking agent solution modified the structure of the biodegradable polymer during crosslinking, negatively affecting the tensile strength of the anti-adhesion film, and in the case of Comparative Example 4, due to the excessively added first solvent, the discharge of the crosslinking agent solution from the spray nozzle during electrospinning was not smooth, and thus crosslinking was limited and the physical properties of the anti-adhesion film were reduced. As described above, in the methods for producing an anti-adhesion film according to various embodiments, since electrospinning is performed in a state in which the biodegradable polymer solution and the crosslinking agent solution are stored in separate syringes, crosslinking of the biodegradable polymer does not occur before electrospinning is performed. In other words, since crosslinking occurs only when the biodegradable polymer solution and crosslinking agent solution discharged by electrospinning come into contact with each other, it may be possible to prevent the biodegradable polymer solution from being hardened by crosslinking before the electrospinning process, and to perform continuous spinning for a long time. Therefore, mass production of the anti-adhesion film is possible and workability and productivity are improved.

In addition, since the process of immersing the anti-adhesion film in the crosslinking agent is not performed, it may be possible to prevent the biodegradable polymer from being lost as it is washed away by the immersion solution during the immersion process. In a conventional method of immersing an anti-adhesion film in a crosslinking agent, an anti-adhesion film is produced by adding an increased amount of a biodegradable polymer considering loss of the biodegradable polymer. However, in various embodiments of the present invention, crosslinking occurs after electrospinning, and thus it is easy to appropriately control the content of the biodegradable polymer in the anti-adhesion film. In addition, due to process automation, mass production of the anti-adhesion film is possible, and it may be possible to produce a large-area anti-adhesion film.

In addition, as one surface and the other surface of the anti-adhesion film are modified to be hydrophilic and hydrophobic, respectively, the one surface modified to be hydrophilic may be brought into contact with the region where adhesion is expected, making it easy to attach the anti-adhesion film to that region. In addition, due to the other surface modified to be hydrophobic, it may be possible to prevent the shape of the anti-adhesion film from being changed by mutual sticking of the surface portions.

In addition, the protrusions according to various embodiments of the present invention are capable of improving the adhesion force of the anti-adhesion film to the region where adhesion is expected, thereby preventing the anti-adhesion film from separating or detaching from the region, thus contributing to improving the anti-adhesion ability.

In addition, when the anti-adhesion film according to various embodiments of the present invention is used in vivo, the second and third protrusions change into a liquid state due to body temperature and water and are mixed with each other to form an adhesive layer having excellent adhesive strength, thereby improving the adhesion force of the anti-adhesion film. In addition, in situations where the anti-adhesion film is not attached to the region where adhesion is expected, the second and third protrusions remain in a solid state and a non-adhesive state, and are capable of forming an adhesive layer only when necessary, indicating that the anti-adhesion film has excellent workability and is convenient to use.

Furthermore, as at least one protrusion is formed on one surface of the anti-adhesion film according to various embodiments of the present invention, the user can easily check the attachment surface of the anti-adhesion film visually or by feeling before attaching the anti-adhesion film to the region where adhesion is expected. In other words, the anti-adhesion film is convenient to use because the user can intuitively distinguish between the hydrophilic surface and the hydrophobic surface of the anti-adhesion film.

In addition, a plurality of protrusions formed on one side of the anti-adhesion film partially increase the thickness of the anti-adhesion film, and thus can prevent the anti-adhesion film from being easily bent by external force when attached to the body, thereby maintaining the attached state stably.

In addition, in the anti-adhesion film according to various embodiments, one surface which is hydrophilic has an increased surface area due to the textured structure formed thereon, and thus has increased adhesion to the region where adhesion is expected. Also, when at least one protrusion is formed on the textured structure, the adhesion of the anti-adhesion film to that region is further improved.

In addition, according to the present invention, as the body of the anti-adhesion film is crosslinked so that it functions as a physical barrier for a specific period of time, it may be possible to produce an anti-adhesion film whose rate of deformation by water in vivo is low, and it may be possible to control the biodegradation rate of the anti-adhesion film to a desired level.

Although the embodiments of the present invention have been described in detail with reference to the accompanying drawings, the above-described embodiments are only preferred examples of the present invention. Therefore, the present invention is not to be construed as being limited only to the above-described embodiments, and the scope of the present invention should be defined by the appended claims and equivalents thereto.

DESCRIPTION OF REFERENCE NUMERALS

10: electrospinning apparatus
100: first syringe
110: biodegradable polymer solution
111: form of fibers
200: second syringe
210: crosslinking agent solution
211: form of droplets
300: power supply unit
400: collector unit
500: driving unit
30, 40, 50, 60: anti-adhesion film
21, 31, 41, 51, 61: one surface
22, 32, 42, 52, 62: other surface
23, 43, 63: textured structure
24: first coating material
25: pore
1000: first coating material
1100: first protrusion
2000: second coating material
2100: second protrusion
3000: third coating material
3100: third protrusion
S: spray device
R: attachment region
L: adhesive layer

The invention claimed is:

1. A method for producing an anti-adhesion film, the method comprising:
a discharge step of separately electrospinning a biodegradable polymer solution filled in a first syringe and a crosslinking agent solution filled in a second syringe; and
a film forming step of forming an anti-adhesion film by crosslinking of a biodegradable polymer by contact between the biodegradable polymer solution discharged in a form of fibers in the discharge step and the crosslinking agent solution discharged in a form of droplets in the discharge step.

2. The method according to claim 1, wherein the biodegradable polymer solution filled in the first syringe in the discharge step comprises at least one selected from the group consisting of collagen, hyaluronic acid, chitosan, and gelatin.

3. The method according to claim 1, wherein the crosslinking agent solution filled in the second syringe in the discharge step comprises a crosslinking agent, a first solvent, and a second solvent of a type different from the first solvent.

4. The method according to claim 3, wherein the crosslinking agent is at least one selected from the group consisting of 1-ethyl-3-(3-dimethylaminopropyl) carbodiimide, dicyclohexyl carbodiimide, polyethylene glycol diacrylate, N-hydroxysuccinimide, and combinations thereof.

5. The method according to claim 1, wherein a concentration of the crosslinking agent in the crosslinking agent solution is 1 to 2 w/w %.

6. The method according to claim 3, wherein the first solvent is water, and the second solvent is an aprotic polar solvent.

7. The method according to claim 1, further comprising a plasma step of modifying a surface of the anti-adhesion film by plasma-treating one surface or the other surface opposite to the one surface of the anti-adhesion film.

8. The method according to claim 1, further comprising a texturing step of forming a textured structure on one surface or the other surface opposite to the one surface of the anti-adhesion film.

9. The method according to claim 1, further comprising an adhesive layer forming step of forming an adhesive layer by applying a first coating material in a dot pattern to one surface or the other surface opposite to the one surface of the anti-adhesion film;
wherein the first coating material is at least one selected from the group consisting of collagen, hyaluronic acid, chitosan, and gelatin.

10. The method according to claim 1, further comprising a pore forming step of forming at least one pore in the anti-adhesion film.

11. The method according to claim 1, further comprising:
a plasma step of modifying a surface of the anti-adhesion film by plasma-treating one surface or the other surface opposite to the one surface of the anti-adhesion film; and
a first protrusion forming step of forming at least one first protrusion by applying a first coating material to the one surface or the other surface of the anti-adhesion film;
wherein the first coating material is at least one selected from the group consisting of collagen, hyaluronic acid, chitosan, and gelatin.

12. The method according to claim 1, further comprising:
a plasma step of modifying a surface of the anti-adhesion film by plasma-treating one surface or the other surface opposite to the one surface of the anti-adhesion film;
a texturing step of forming a textured structure on the one surface or the other surface of the anti-adhesion film; and
a first protrusion forming step of forming at least one first protrusion by applying a first coating material to the surface having the textured structure formed thereon;

wherein the first coating material is at least one selected from the group consisting of collagen, hyaluronic acid, chitosan, and gelatin.

13. The method according to claim 1, further comprising:
a plasma step of modifying a surface of the anti-adhesion film by plasma-treating one surface or the other surface opposite to the one surface of the anti-adhesion film; and
a first protrusion and second protrusion forming step of forming at least one first protrusion by applying a first coating material to the one surface or the other surface of the anti-adhesion film and of forming at least one second protrusion by applying a second coating material of a type different from the first coating material to the surface having the first protrusion formed thereon;
wherein, when the second first protrusion and the second protrusion change to a liquid state, the first coating material and the second coating material are mixed with each other to form an adhesive layer.

14. The method according to claim 1, further comprising:
a plasma step of modifying a surface of the anti-adhesion film by plasma-treating one surface or the other surface opposite to the one surface of the anti-adhesion film;
a texturing step of forming a textured structure on the one surface or the other surface of the anti-adhesion film; and
a first protrusion and second protrusion forming step of forming at least one first protrusion by applying a first coating material to the surface having the textured structure formed thereon and of forming at least one second protrusion by applying a second coating material of a type different from the first coating material to the surface having the textured structure formed thereon;
wherein, when the first protrusion and the second protrusion change to a liquid state, the first coating material and the second coating material are mixed with each other to form an adhesive layer.

15. The method according to claim 13, wherein the first coating material is at least one of 4-arm polyethylene glycol-thiosuccinimidyl glutarate and methoxy polyethylene glycol amine, and the second coating material is at least one of L-lysine and poly(L-lysine).

16. The method according to claim 14, wherein the first coating material is at least one of 4-arm polyethylene glycol-thiosuccinimidyl glutarate and methoxy polyethylene glycol amine, and the second coating material is at least one of L-lysine and poly(L-lysine).

* * * * *